(12) United States Patent
Meyer et al.

(10) Patent No.: US 11,524,466 B2
(45) Date of Patent: Dec. 13, 2022

(54) COMPOSITE ASSEMBLY

(71) Applicant: AIRBUS OPERATIONS LIMITED, Bristol (GB)

(72) Inventors: Jonathan Meyer, Bristol (GB); Philip Nicholas Parkes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 373 days.

(21) Appl. No.: 16/101,911

(22) Filed: Aug. 13, 2018

(65) Prior Publication Data

US 2019/0047232 A1 Feb. 14, 2019

(30) Foreign Application Priority Data

Aug. 14, 2017 (GB) ..................... 1712999

(51) Int. Cl.
*B32B 5/12* (2006.01)
*B29C 65/00* (2006.01)
(Continued)

(52) U.S. Cl.
CPC ........ *B29C 66/30321* (2013.01); *B29C 65/02* (2013.01); *B29C 65/64* (2013.01);
(Continued)

(58) Field of Classification Search
CPC ............ B29C 66/30321; B29C 66/303; B29C 66/3032; B29C 66/112; B29C 66/1122; B29C 66/472; B29C 66/474; B29C 66/721; B29C 66/7212; B29C 66/72141; B29C 66/723; B29C 66/73751; B29C 66/73752; B29C 66/742; B29C 66/7428; B29C 66/81431; B29C 66/81433; B29C 66/71;
(Continued)

(56) References Cited

U.S. PATENT DOCUMENTS 3,856,605 A * 12/1974 Carpenter ......... B29C 66/73921
156/436
5,868,886 A * 2/1999 Alston .................. B29C 65/564
156/92

(Continued)

FOREIGN PATENT DOCUMENTS

GB  2508656  6/2014
GB  2539795  12/2016

(Continued)

OTHER PUBLICATIONS

Combined Search and Examination Report for GB1712999.0, dated Feb. 15, 2018, 8 pages.

*Primary Examiner* — Megha M Gaitonde
(74) *Attorney, Agent, or Firm* — Nixon & Vanderhye P.C.

(57) ABSTRACT

A composite assembly with a laminate of fibre plies impregnated with a laminate matrix material is disclosed having pad of fibre plies impregnated with a pad matrix material, and a part with a body with protrusions which extend from the body and penetrate at least some of the fibre plies of the pad. The pad is bonded to the laminate by a stepped lap joint or a scarf joint. The assembly is manufactured by pressing the protrusions into the pad, and after the protrusions have been pressed into the pad, curing a pad matrix material impregnating the pad, and bonding the pad to the laminate.

19 Claims, 9 Drawing Sheets

(51) Int. Cl.
| | |
|---|---|
| *B29C 65/02* | (2006.01) |
| *B29C 65/82* | (2006.01) |
| *B29C 65/64* | (2006.01) |
| *B29C 70/24* | (2006.01) |
| *B29C 70/86* | (2006.01) |
| *B32B 17/00* | (2006.01) |
| *B32B 15/14* | (2006.01) |

(52) U.S. Cl.
CPC ........ *B29C 65/8292* (2013.01); *B29C 66/112* (2013.01); *B29C 66/1122* (2013.01); *B29C 66/472* (2013.01); *B29C 66/474* (2013.01); *B29C 66/721* (2013.01); *B29C 66/723* (2013.01); *B29C 66/7212* (2013.01); *B29C 66/72141* (2013.01); *B29C 66/73751* (2013.01); *B29C 66/73752* (2013.01); *B29C 66/742* (2013.01); *B29C 66/81431* (2013.01); *B29C 66/82* (2013.01); *B29C 66/8322* (2013.01); *B29C 70/24* (2013.01); *B29C 70/86* (2013.01); *B32B 5/12* (2013.01); *B32B 15/14* (2013.01); *B32B 17/00* (2013.01); *B29C 65/8253* (2013.01); *B29C 66/71* (2013.01); *B29C 66/7394* (2013.01); *B29C 66/73941* (2013.01); *B29C 66/7428* (2013.01); *B32B 2260/021* (2013.01)

(58) Field of Classification Search
CPC .......... B29C 66/7394; B29C 66/73941; B29C 65/64; B32B 3/28; B32B 5/12; B32B 5/22; B32B 5/28; B32B 15/14; B32B 17/02; B32B 17/04; B32B 2250/03; B32B 2250/05; B32B 2260/02; B32B 2260/021; B32B 2260/023; B32B 2260/046; Y10T 428/24058; Y10T 428/24124; Y10T 428/24479; Y10T 428/24521; Y10T 428/24603; Y10T 428/24612; Y10T 428/24628; Y10T 428/24669
USPC ....... 428/105, 113, 156, 161, 171, 172, 174, 428/179
See application file for complete search history.

(56) References Cited

U.S. PATENT DOCUMENTS

| | | | |
|---|---|---|---|
| 5,876,540 A | * | 3/1999 | Pannell ................ B29C 65/344 156/91 |
| 2011/0240200 A1 | * | 10/2011 | Korya ............... B29C 66/43441 156/60 |
| 2016/0297138 A1 | * | 10/2016 | De Traglia Amancio Filho ......... B29C 66/112 |

FOREIGN PATENT DOCUMENTS

| | | |
|---|---|---|
| WO | 2003/031159 | 4/2003 |
| WO | 2008/110835 | 9/2008 |

\* cited by examiner uncured prepreg uncured prepreg cured prepreg

COMPOSITE ASSEMBLY

CROSS RELATED APPLICATION

This application claims priority to United Kingdom (GB) patent application 1712999.0, filed Aug. 14, 2017, the entire contents of which is hereby incorporated by reference.

FIELD OF THE INVENTION

The present invention relates to a composite assembly.

BACKGROUND OF THE INVENTION

A known composite assembly is described in WO2008/110835, in which metallic projections are pressed into a laminate of fibre plies.

It has been found by experiment that the insertion force required to insert metallic projections into a laminate of fibre plies can be very high, potentially resulting in damage to the laminate. There may also be restricted access to the laminate, if it is geometrically complex.

SUMMARY OF THE INVENTION

A first aspect of the invention provides a composite assembly comprising: a laminate of fibre plies impregnated with a laminate matrix material; a pad of fibre plies impregnated with a pad matrix material, wherein the pad is bonded to the laminate; and a part comprising a body with protrusions which extend from the body and penetrate at least some of the fibre plies of the pad. The assembly may have only a single pad/part unit, but more typically it has a plurality of units, each unit comprising: a pad of fibre plies impregnated with a pad matrix material, and a part comprising a body with protrusions extending from the body, wherein the protrusions penetrate at least some of the fibre plies of the pad; and the pad of each unit is bonded to the laminate.

A further aspect of the invention provides a method of manufacturing a composite assembly, the method comprising: providing a part comprising a body with protrusions extending from the body; pressing the protrusions into a pad of fibre plies so that the protrusions penetrate at least some of the fibre plies of the pad; and after the protrusions have been pressed into the pad: curing a pad matrix material impregnating the pad, and bonding the pad to a laminate of fibre plies impregnated with a laminate matrix material.

A further aspect of the invention provides a method of manufacturing a composite assembly, the method comprising: receiving a plurality of units, each unit comprising a pad of fibre plies impregnated with a pad matrix material and a part comprising a body with protrusions extending from the body, wherein the protrusions penetrate at least some of the fibre plies of the pad; and bonding the pad of each unit to a laminate of fibre plies impregnated with a laminate matrix material so that the pads are integrated with the laminate.

Optionally the (or each) pad is bonded to the laminate by a stepped lap joint or a scarf joint.

Optionally the (or each) pad is embedded within the laminate. In this case, typically a hole (or holes) extends through some, or all, of the fibre plies of the laminate; and each pad is embedded within a respective one of the holes.

Optionally the body of the (or each) part has an embedded portion which is embedded within the pad and a protruding portion which protrudes from the pad; and the protrusions extend from the embedded portion.

Optionally the (or each) pad comprises a stack of three or more layers; each layer comprises one or more of the pad plies; each layer has a different area; and the areas of the layers decrease monotonically from a base layer with the largest area to an apex layer with the smallest area. The protrusions may penetrate the apex layer and extend towards the base layer. Alternatively this may be reversed so that the protrusions penetrate the base layer and extend towards the apex layer.

Optionally each fibre ply of the pad has a square, diamond or circular shape.

Typically the body and the protrusions are formed from the same material (preferably as a single piece, and typically not a fibre-reinforced composite material).

Optionally the body and the protrusions are formed from metal material—either the different metal materials but more typically the same metal material.

Preferably the protrusions do not penetrate the body of the part—in other words they are not Z-pins or other reinforcement elements which penetrate the body of the part as well as the pad.

The pad matrix material and the laminate matrix material may have substantially the same chemical composition; or they may have different chemical compositions: for example epoxy resins with a different viscosity.

Typically the pad matrix material and the laminate matrix material are both polymer materials.

Optionally the pad matrix material is a thermoplastic material. In this case the protrusions may be pressed into the pad with the thermoplastic material at an elevated temperature, and the step of curing the pad matrix material comprises allowing the thermoplastic material to cool and harden. Alternatively the thermoplastic material may be introduced into the pad by infusion after the protrusions have been pressed into the pad, and then allowed to cure by coiling. Alternatively the pad matrix material is a thermosetting material, and the step of curing the pad matrix material comprises heating the thermosetting material so that it hardens.

Typically the pad is bonded to the laminate by a co-cured joint, a co-bonded joint, a co-infused joint or a secondary bonded joint. In some embodiments the pad is bonded to the laminate by a co-cured joint, a co-bonded joint or a co-infused joint. In other embodiments the pad is bonded to the laminate by a secondary bonded joint comprising an adhesive between the pad and the laminate.

Optionally the pad matrix material contacts the protrusions to form co-bonded joints which bond the pad to the protrusions.

Optionally the method further comprises laying the fibre plies of the laminate onto the pad after the protrusions have been pressed into the pad and before the pad is bonded to the laminate. Typically the laying of the fibre plies of the laminate onto the pad causes the pad to become embedded within the laminate. The fibre plies of the laminate may be laid onto the pad by a hand lay-up process or by an automated process such as automated tape laying (ATL) or automated fibre placement (AFP). Each fibre ply of the laminate may be laid onto the pad in a single hand layup operation; or as a series of strips of tape or fibre in an ATL or AFP process, or similar.

Optionally the method further comprises inspecting the pad and/or the part for defects after the protrusions have been pressed into the pad and before the pad is bonded to the laminate, for instance by visual inspection, ultrasonic inspection or radiographic inspection.

The pad matrix material may be cured before the pad is bonded to the laminate, or at the same time that the pad is bonded to the laminate.

Optionally the pad matrix material contacts the protrusions as it cures to form co-bonded joints which bond the pad to the protrusions.

In some embodiments, as the protrusions are pressed into the pad they penetrate the pad matrix material impregnating the pad. For example the pad may be a prepreg composite material.

In other embodiments, as the protrusions are pressed into the pad the fibre plies of the pad are dry fibre plies which are not yet impregnated with the pad matrix material. In these dry fibre embodiments the method further comprises infusing the dry fibre plies of the pad with the pad matrix material in an infusion stage after the protrusions have been embedded into the pad, and then curing the pad matrix material (by heating it or allowing it to cool). Optionally the method further comprises infusing the laminate with the laminate matrix material in the infusion stage so that the pad matrix material and the laminate matrix material coalesce, and then co-curing the pad matrix material and the laminate matrix material to simultaneously form a co-infused joint between the pad and the laminate.

Optionally the pad is bonded to the laminate by curing the pad matrix material in contact with the laminate matrix material and/or by curing the laminate matrix material in contact with the pad matrix material. The pad may be bonded to the laminate by curing the laminate matrix material in contact with the pad matrix material to form a co-bonded joint between the pad and the laminate; or the pad may be bonded to the laminate by curing the pad matrix material in contact with the laminate matrix material to form a co-bonded joint between the pad and the laminate.

In some embodiments the pad is bonded to the laminate by simultaneously curing the pad matrix material and the laminate matrix material, wherein the pad matrix material and the laminate matrix material coalesce to form a co-cured or co-infused joint between the pad and the laminate.

The fibre plies of the pad may comprise unidirectional fibres, or woven fibres. Similarly the fibre plies of the laminate may comprise unidirectional fibres, or woven fibres.

DESCRIPTION OF THE DRAWINGS

Embodiments of the invention will now be described with reference to the accompanying drawings, in which.

DETAILED DESCRIPTION OF EMBODIMENT(S)

Figure 1:
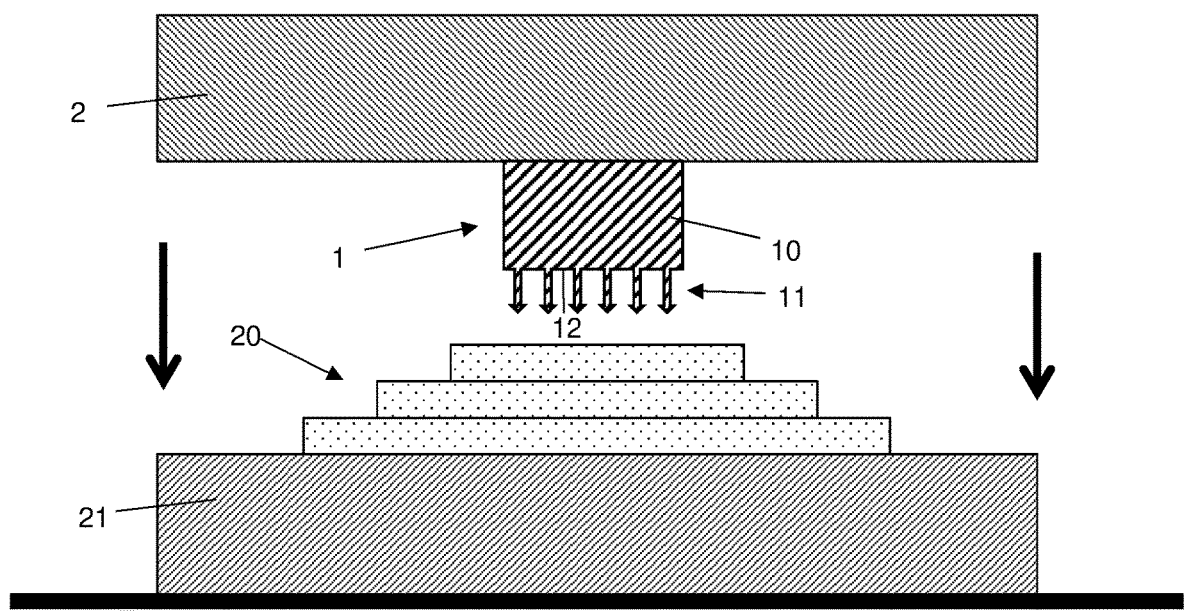
FIGS. 1 and 2 show a pressing operation.
Figure 1:
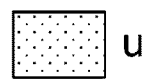

A method of manufacturing a composite assembly is shown in FIGS. 1-12. A metallic part 1 is mounted on an upper press tool 2. The metallic part 1 has a body 10 with pointed protrusions 11 extending from a lower face 12 of the body. The protrusions 11 are formed from the same metal material as the body 10—typically as a single piece, for instance by additive manufacturing. The metal material may be titanium for example.

A pad 20 of prepreg fibre plies is laid up onto a lower press tool 21. The pad 20 comprises a stack of three stack layers 22-24; each stack layer 22-24 comprising a plurality of prepreg fibre plies. By way of example the pad 20 may have a total of 20-40 prepreg fibre plies of thickness 0.25 mm to 0.125 mm, giving a total pad thickness of about 5 cm.

Figure 3:
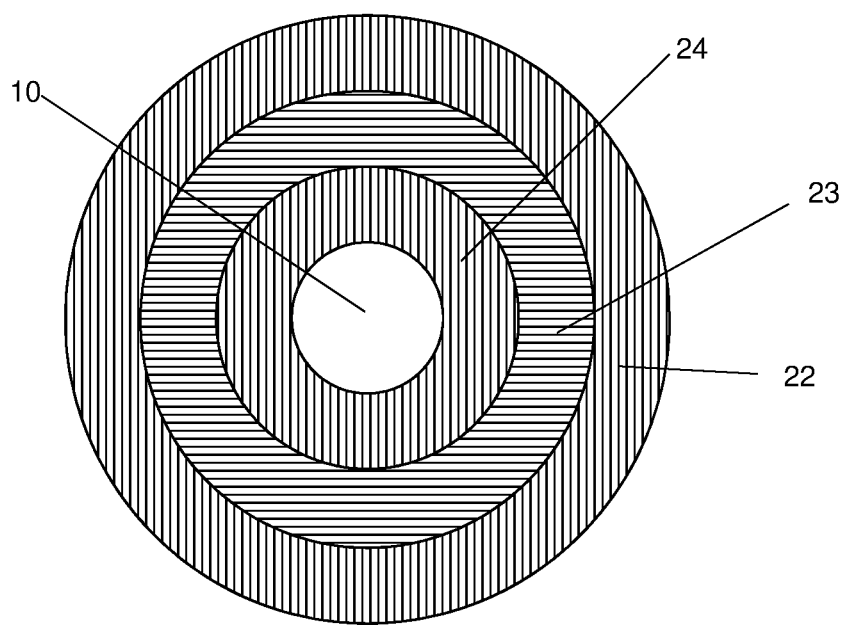
FIGS. 3-5 show different profiles of the pad.
Figure 4:
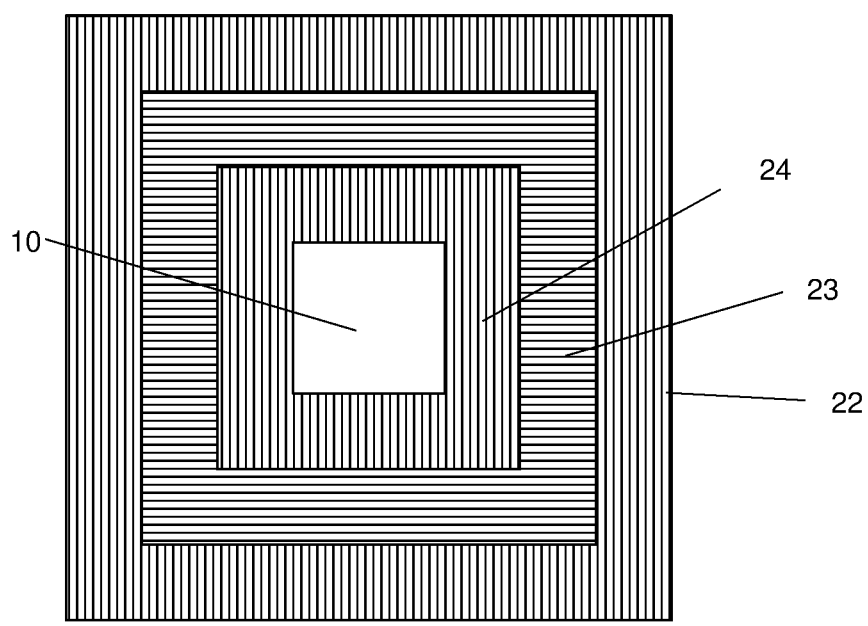
Figure 5:
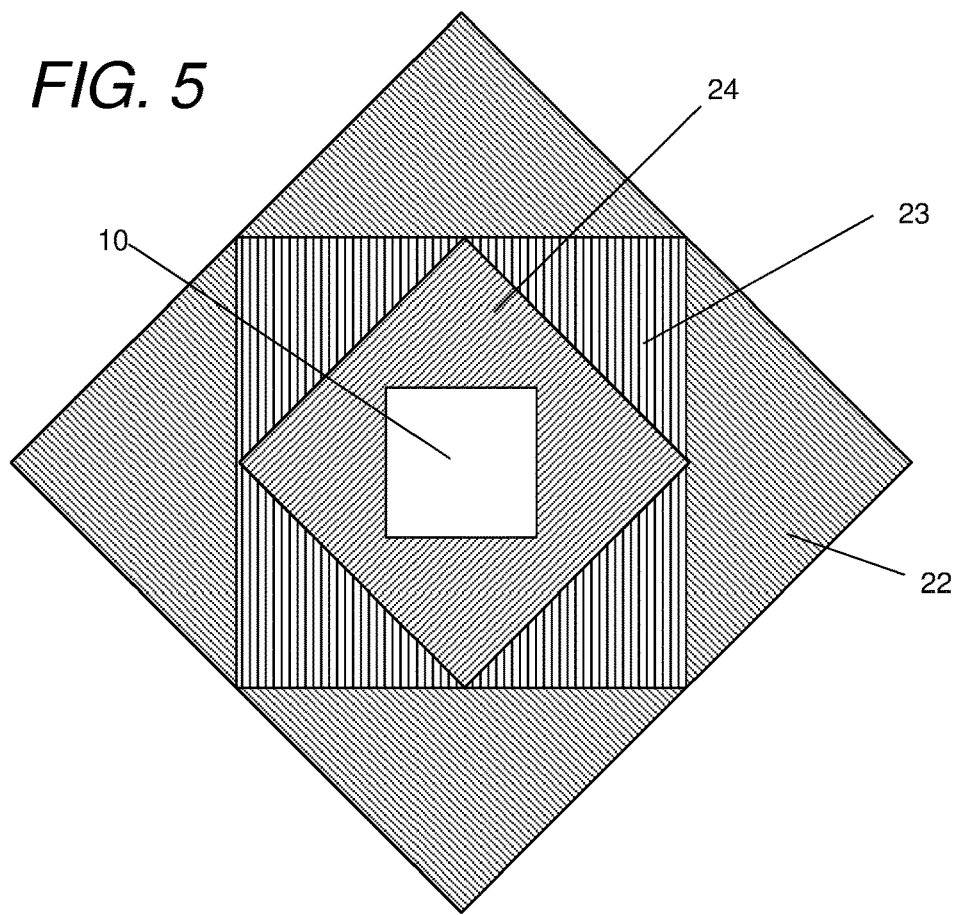

Each stack layer 22-24 has a different area, and the areas of the stack layers 22-24 decrease monotonically from a base stack layer 22 with the largest area to an apex stack layer 24 with the smallest area. FIGS. 3-5 give three different shapes for the stack layers: circular (FIG. 3), square (FIG. 4) or alternating square and diamond-shaped (FIG. 5). Each prepreg fibre ply of the pad 20 consists of a layer of unidirectional carbon fibres impregnated with a pad matrix material, such as a thermosetting epoxy resin. The shading of the layers 22-24 in FIG. 3-5 illustrates the different fibre directions of the upper ply of each layer.

Figure 2:
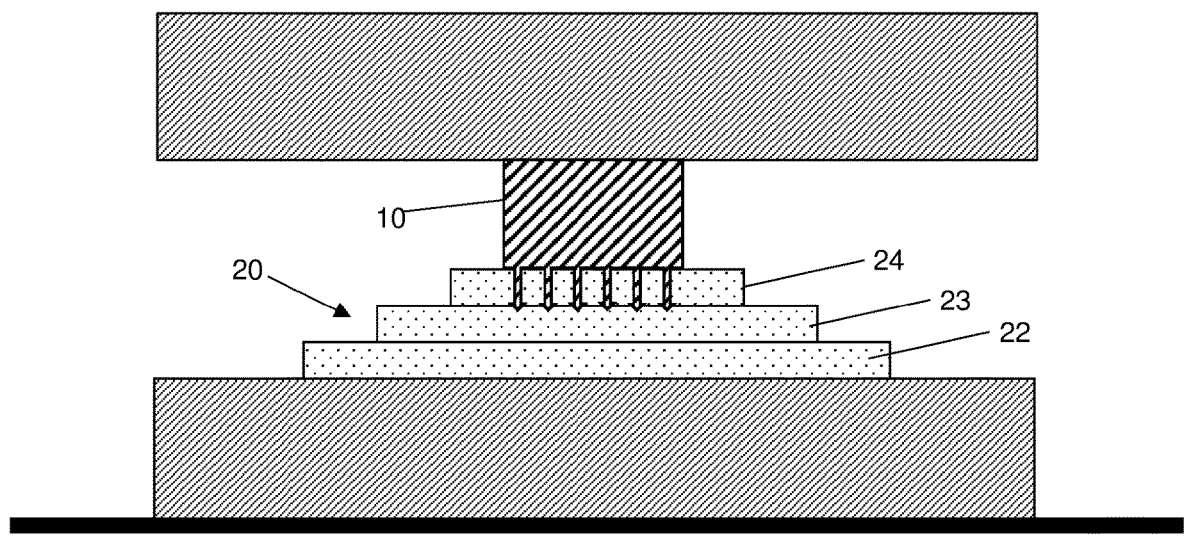

The protrusions 11 are pressed into the pad 20 of fibre plies by the upper press tool 2 so that the protrusions 11 penetrate some of the fibre plies of the pad 20 as shown in FIG. 2. In this case the protrusions 11 penetrate the apex layer 24 and part of the layer 23, but other penetration depths are possible including full penetration. The lower face 12 of the body contacts the upper face of the pad 20 once the protrusions 11 have been fully pushed in.

After the protrusions 11 have been pressed into the pad 2, the pad/part unit is placed in an autoclave and covered with a vacuum bagging film. The heat and pressure in the autoclave are then increased to consolidate the pad 20 and cure the pad matrix material impregnating the pad 20. The pad matrix material cures in contact with the protrusions 11 to form co-bonded joints which bond the pad 20 to the protrusions 11, and a co-bonded joint which bonds the upper face of the pad 20 to the lower face 12 of the body. This results in a so-called hybrid joint between the part 1 and the pad 20: that is, a joint with a combination of mechanical fastening and bonding. The mechanical fastening is provided by the interlocking of the protrusions 11 with the fibres, and the bonding is provided by the co-bonded joints.

Figure 6:
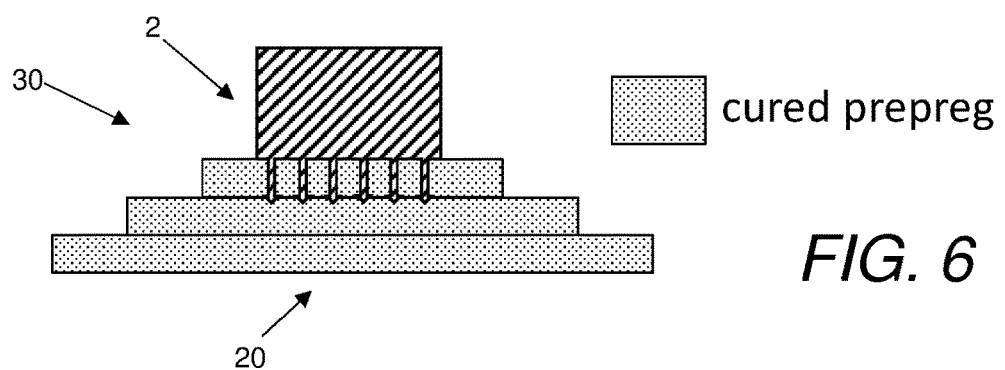
FIG. 6 shows a hybrid joint unit after the pad has been cured.
Figure 7:
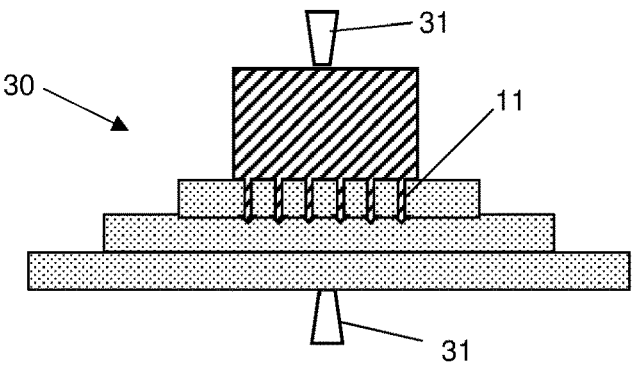
FIG. 7 shows the hybrid joint unit of FIG. 6 being inspected.

FIG. 6 shows the hybrid joint unit 30 provided by the part 1 joined to the cured pad 20. The hybrid joint unit 30 is removed from the autoclave and inspected for defects. In the example of FIG. 7 an ultrasonic inspection device 31 is used to the inspect the hybrid joint unit 30. The relatively small size of the pad 20 enables the ultrasonic inspection device 31 to contact the pad in the two positions shown in FIG. 7, relatively close to the protrusions 11. The hybrid joint unit 30 may also be inspected by other methods such as visual inspection or radiographic inspection. If a significant defect is detected, then the hybrid joint unit 30 is discarded. Otherwise, it is then integrated with a composite laminate by the process shown in FIGS. 8-12.

Figure 8:
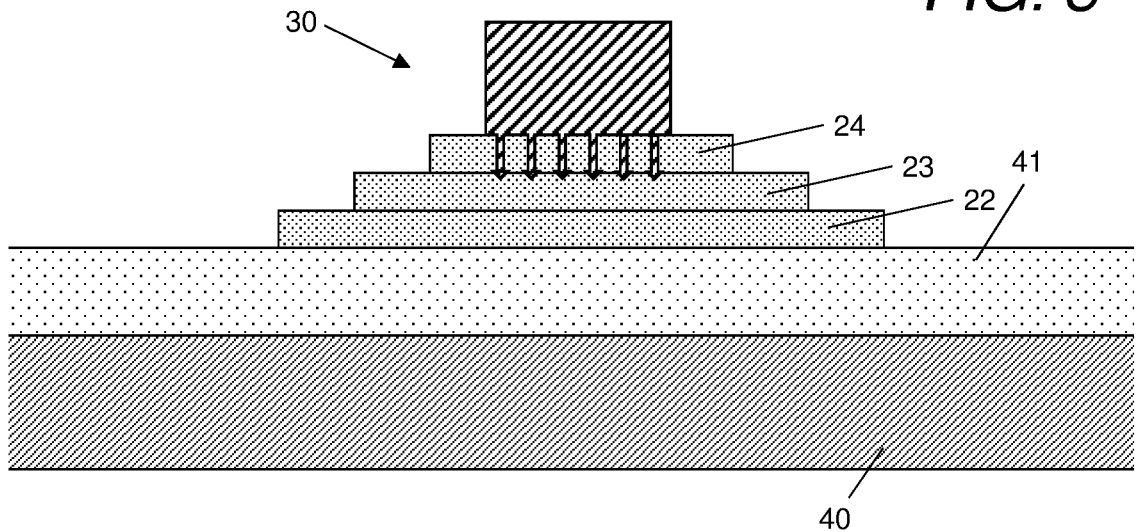
FIGS. 8-11 show various manufacturing steps which integrate the hybrid joint unit into a laminate composite structure.

FIG. 8 shows a layup table 40 carrying a panel 41. The panel 41 is a laminate of prepreg fibre plies impregnated with an uncured laminate matrix material, such as a thermosetting epoxy resin. The prepreg fibre plies of the panel 41 are assembled on the layup table 40 by a hand lay-up process or by an automated process such as automated tape laying (ATL) or automated fibre placement (AFP). Each fibre ply of the panel 41 may be laid onto the layup table 40 in a single hand layup operation; or as a series of strips of tape or fibre in an ATL or AFP process, or similar.

Figure 9:
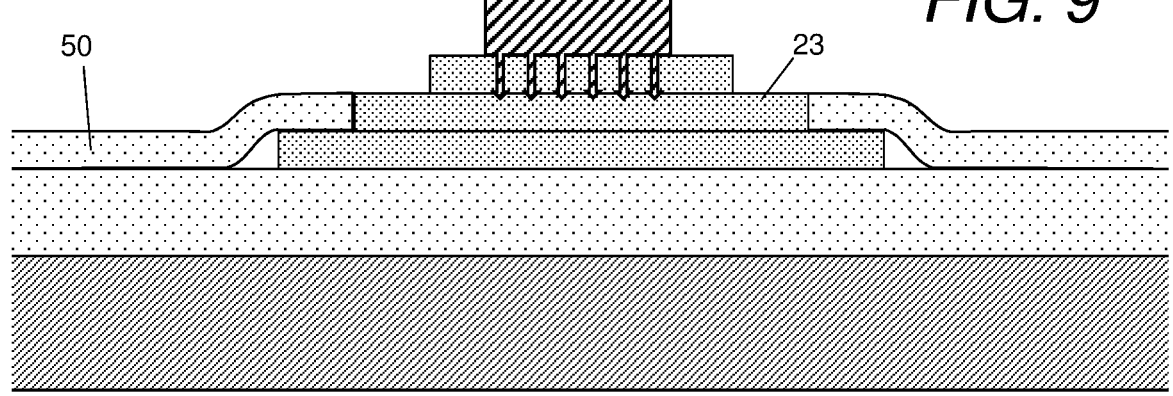
Figure 10:
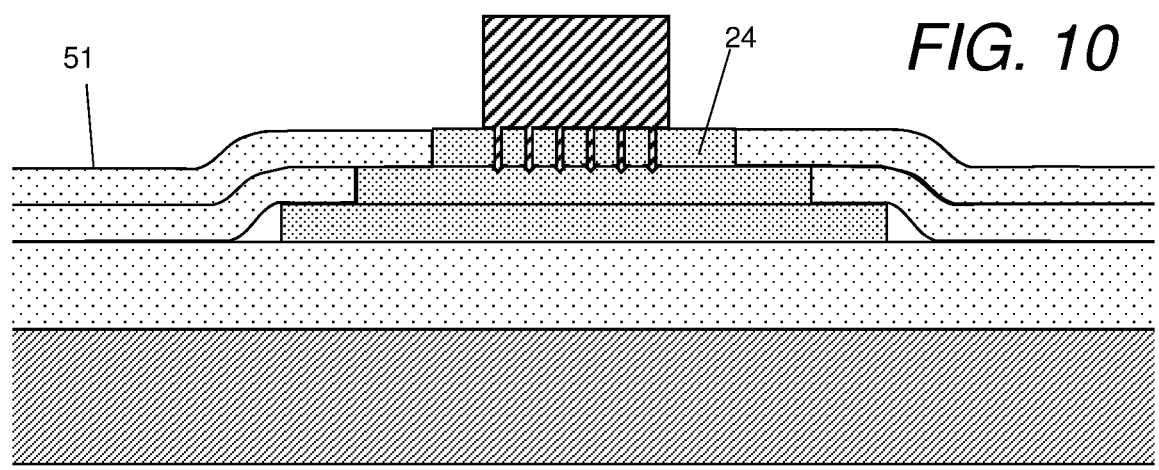
Figure 11:
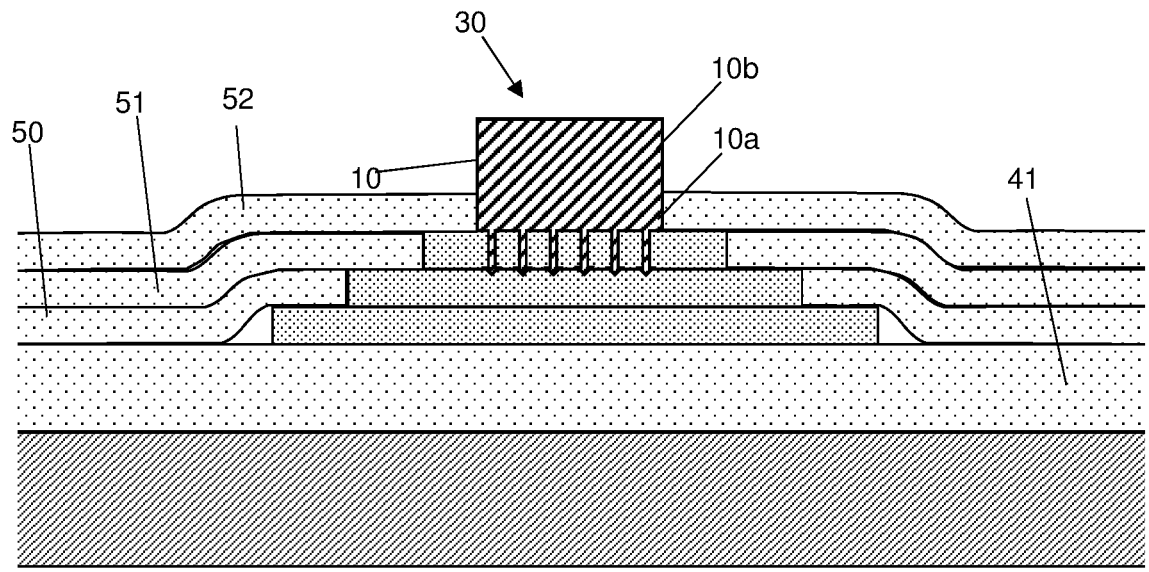
Figure 11:
Figure 11:

The hybrid joint unit 30 is first placed on top of the panel 41 as shown in FIG. 8, then a first laminate layer 50 is laid onto the pad 20 as shown in FIG. 9 on top of the base layer 22. The laminate layer 50 is a laminate of prepreg fibre plies, impregnated with the same uncured laminate matrix material as the panel 41. Next a second laminate layer 51 is laid onto the pad 20 as shown in FIG. 10 on top of the layer 23. The laminate layer 51 is also a laminate of prepreg fibre plies impregnated with the same uncured laminate matrix material as the panel 41. Next a third laminate layer 52 is laid onto the pad 20 as shown in FIG. 11 on top of the apex layer 24. The third laminate layer 52 is also a laminate of prepreg fibre plies impregnated with the same uncured laminate matrix material as the panel 41. The lamination process is then stopped, leaving a lower portion 10a of the body embedded within the laminate and an upper portion 10b of the body protruding from the laminate as indicated in FIG. 11.

The fibre plies of the laminate layers 50-52 may be laid onto the pad 20 by a hand lay-up process or by an automated process such as automated tape laying (ATL) or automated fibre placement (AFP). If each fibre ply is be laid onto the pad 20 in a single hand layup operation, then it is precut with a hole appropriately sized to accommodate one of the laminate layers 50-52 or the body 10 of the part. If ATL or AFP is used, then each fibre ply of each laminate layer 50-52 is assembled around the one of the laminate layers 50-52 or the body 10 of the part as a series of strips of tape or fibre.

The uncured composite assembly of FIG. 11 constitutes two elements: a laminate comprising the panel 41 and layers 50-52; and the hybrid joint unit 30 embedded within the laminate layers 50-52. The assembly of FIG. 11 is then heated and compressed to consolidate and cure the epoxy resin laminate matrix material impregnating the laminate 41, 50-52. This curing process causes the hybrid joint unit 30 to become co-bonded to the laminate 41, 50-52. More specifically, the laminate matrix material is cured in contact with the cured pad matrix material to form a co-bonded stepped lap joint between the pad 20 and the laminate layers 50, 51, and a co-bonded joint between the bottom surface of the pad 20 and the top surface of the panel 41. The curing of the laminate matrix material in contact with the side of the body 10 also forms a co-bonded joint between the side of the embedded part 10a of the body and the top laminate layer 52.

Figure 12:
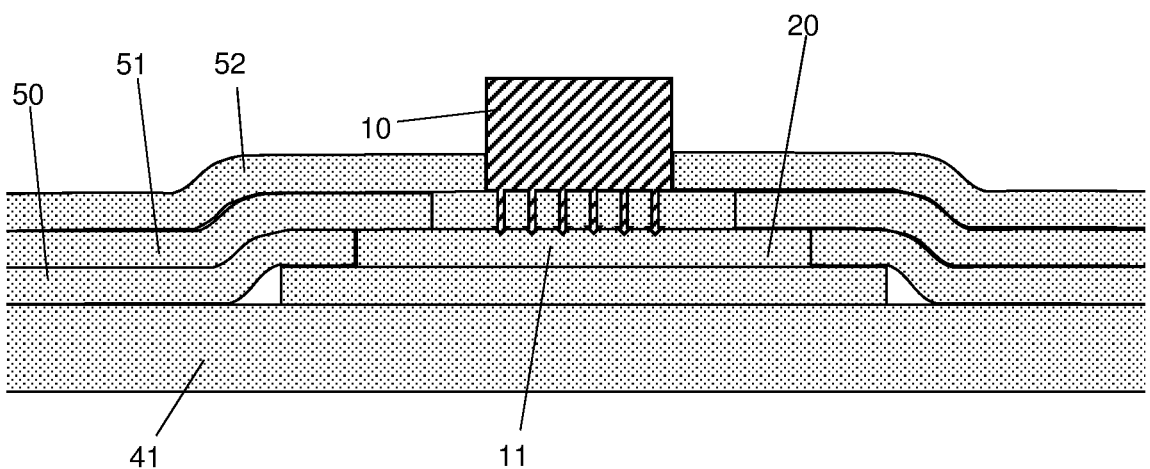
FIG. 12 shows a composite assembly formed by the process of FIGS. 8-11 after the final curing stage.

FIG. 12 shows the resultant cured composite assembly which comprises: the laminate 41, 50-52 of fibre plies impregnated with cured laminate matrix material; the pad 20 of fibre plies impregnated with cured pad matrix material; and the metallic part 1 with its protrusions 11 penetrating the pad 20. The pad 20 and the body 10 of the metal part are co-bonded to the laminate 41, 50-52; and the pad 20 is also co-bonded to the metal part 10, 11.

Figure 13:
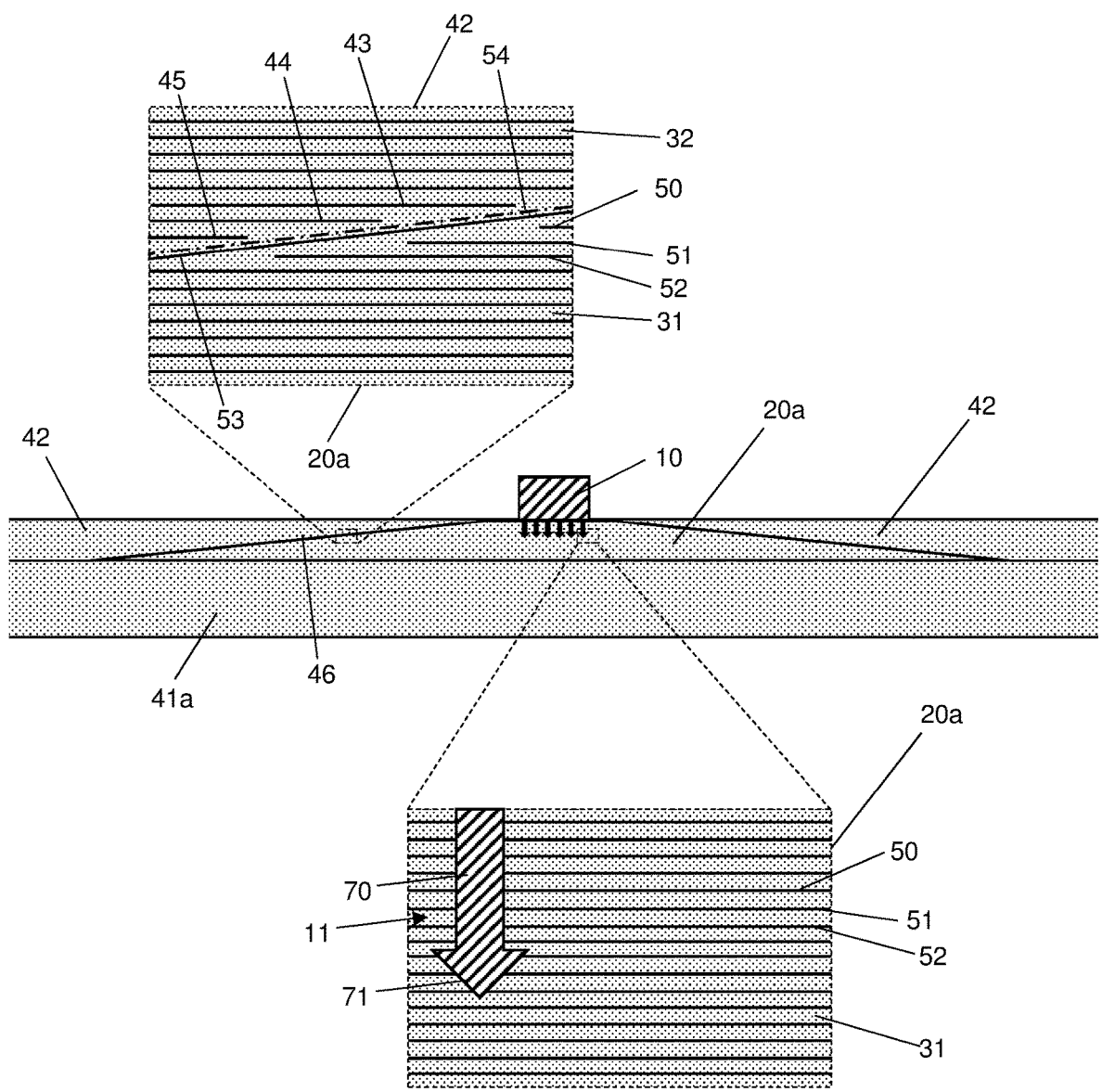
FIG. 13 shows a composite assembly in which the pad is bonded to the laminate via a scarf joint.

In FIG. 12, the pad 20 and the laminate layers 50-52 are joined by a stepped lap joint with three steps. FIG. 13 shows an alternative composite assembly in which a pad and laminate are joined by a scarf joint. The laminate in FIG. 13 comprises a lower panel 41a equivalent to the panel 41 in FIG. 12; and an upper panel 42 equivalent to the laminate layers 50-52 in FIG. 12. The panels 41a, 42 comprise stacks of fibre plies impregnated with a laminate matrix material, such as an epoxy resin. The pad 20a is equivalent to the pad 20 in FIG. 12, and comprises a stack of fibre plies impregnated with a pad matrix material such as an epoxy resin. The various elements of the composite assembly of FIG. 13 are manufactured using a similar process to the process previously described in FIGS. 8-12, so this process will not be described again.

The upper enlarged view in FIG. 13 shows the detail of the scarf joint between the pad 20a and the upper panel 42. The individual fibre plies 43-45 of the upper panel 42 are equivalent to the laminate layers 50-52 in FIG. 12. The fibre plies 43-45 are formed with holes forming an inward-facing ramp 46 with a ramp angle of about 1:10; and the fibre plies 50-52 of the pad 20a are terminated to form an outward-facing ramp with the same ramp angle of about 1:10. A prepreg cover ply 53 covers the upper surface of the pad 20a. The cover ply 53 covers the outward-facing ramp formed by the edges of the fibre plies 50-52 to prevent delamination before the pad 20a is integrated into the laminate. The cover ply 53 also covers the top of the pad 20a so it is penetrated by the protrusions 11 before being co-cured with the rest of the pad 20a. The cover ply 53 contacts the inward-facing ramp 46 of the upper panel 42 to form a co-bonded scarf joint. Alternatively the cover ply 53 may be omitted. In this case the joint will be a stepped lap joint similar to the stepped lap joint of FIG. 12, but with a much larger number of steps (each step being a single ply rather than a multi-ply layer).

In a further alternative, an adhesive or thermoplastic film may be draped over the upper surface of the pad 20a instead of the prepreg cover ply 53, or on top of the prepreg cover ply 43. In this case the scarf joint will be a secondary-bonded scarf joint rather than a co-bonded scarf joint.

The upper enlarged view in FIG. 13 also shows the pad matrix material 31 impregnating the fibre plies 50-53 of the pad 20a, and the laminate matrix material 32 impregnating the fibre plies 43-45 of the laminate panel 42. The pad matrix material 31 and the laminate matrix material 32 meet at an angled bond line 54. Typically they are both epoxy resins with substantially the same chemical composition.

The lower enlarged view in FIG. 13 shows the detail of the joint between the pad 20a and one of the protrusions 11. The protrusion 11 has a shaft 70 and a pointed arrow-shaped head 71. The pad matrix material 31 impregnating the fibre plies 50-52 of the pad 20a forms a co-bonded joint with the shaft 70 and head 71 of each protrusion 11.

The fibre plies 43-45 of the laminate and the fibre plies 50-52 of the pad may only contain fibres of one material such as carbon. Alternatively the fibre plies 43-45 of the laminate may be made from a different material than the fibre plies 50-52 of the pad: for example the fibre plies 43-45 of the laminate may be carbon, and the fibre plies 50-52 of the pad may be glass, or a mixture of carbon fibre and glass fibre.

Figure 14:
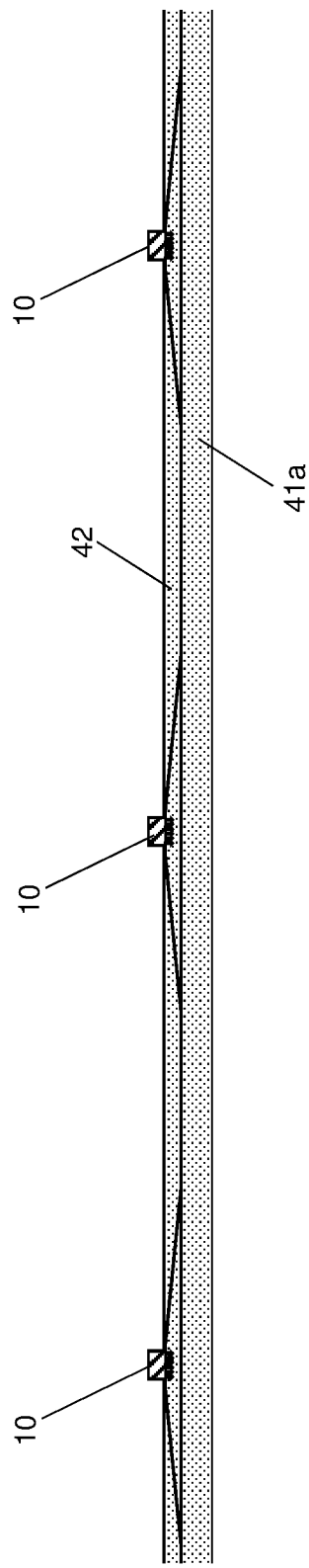
FIG. 14 shows a composite assembly with multiple hybrid joint units.

The manufacturing process described above is particularly well suited to the assembly of a large composite structure with many hybrid joint units integrated into a large laminate composite structure. FIG. 14 gives an example of such a large composite structure. In a first step, multiple hybrid joint units are manufactured and inspected using the process of FIGS. 1-7. Any units with defects are discarded, and the remaining units are embedded within a large laminate 41a, 42 as shown in FIG. 14. FIG. 14 shows only three hybrid joint units, but in practice there may be many more. The benefit of this manufacturing approach is that it avoids the risk of damage to the large laminate 41a, 42 as the protrusions are inserted.

Figure 15:
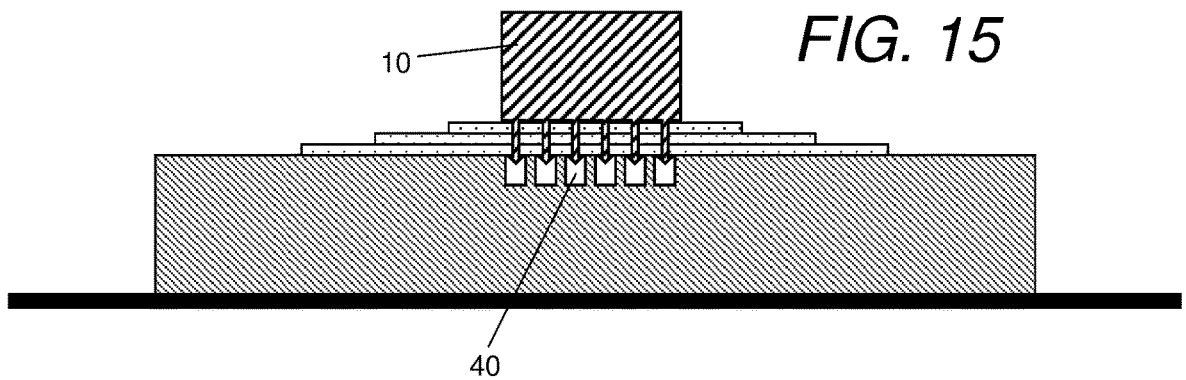
FIGS. 15 and 16 show a pressing operating in which the protrusions penetrate a full thickness of the pad.
Figure 16:
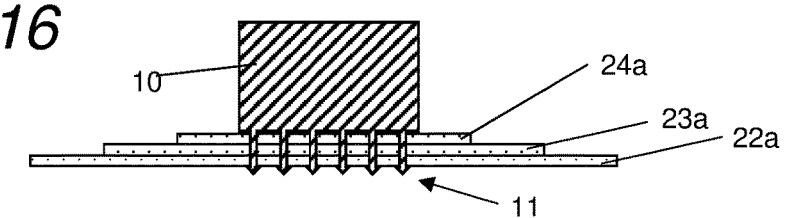
Figure 17:
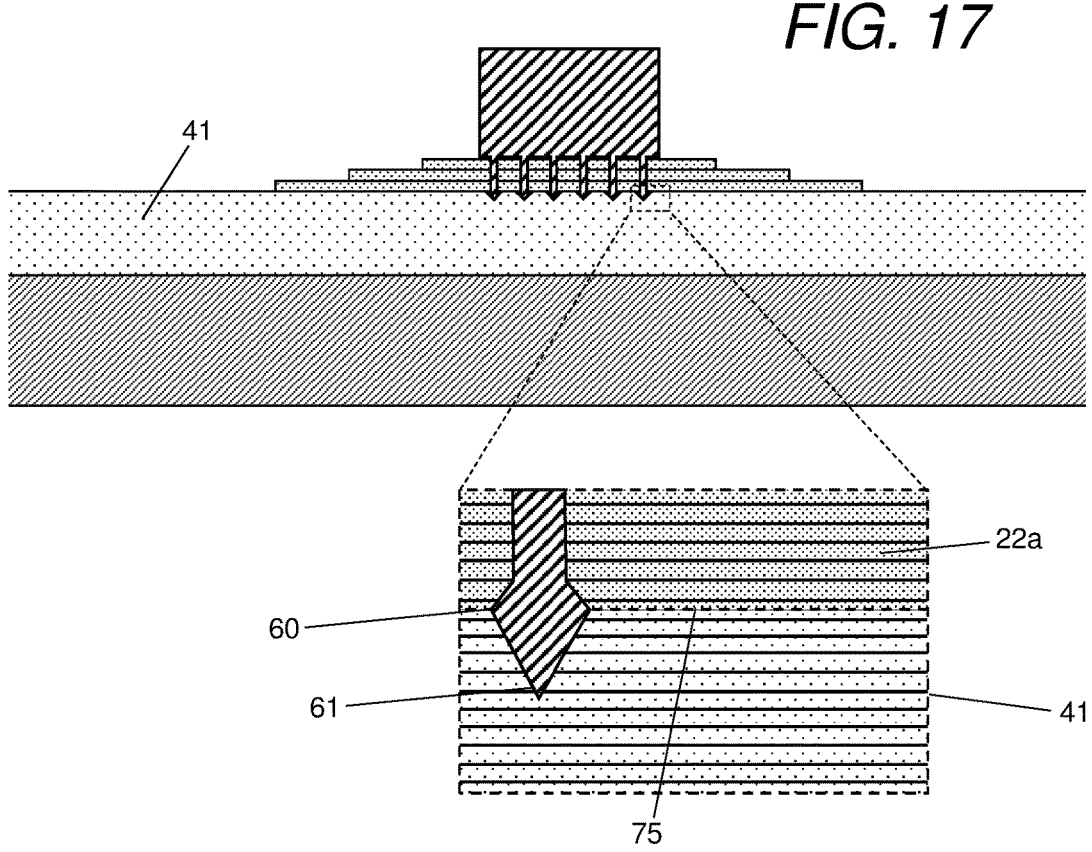
FIG. 17 shows the first step of integrating the unit of FIG. 16 into a laminate.

FIGS. 15-17 show an alternative manufacturing approach using a pad with layers 22a-24a which are equivalent to the layers 22-24 in FIG. 2 but less thick so the protrusions 11 are pushed all the way through the pad and out of the other side where they are received in small depressions 40 in the surface of the lower press tool. This enables the tips of the protrusions 11 to be visually inspected before the composite assembly is integrated into the laminate structure. FIG. 17 includes an enlarged view of the tip of one of the protrusions showing an alternative shape for the tip. In the previous embodiments, the protrusions 11 have an arrow-head tip 71, but in the alternative shape shown in the enlarged view of FIG. 17, the tip widens gradually to a shoulder 60 before narrowing to a tip 61. The tip 61 is pushed through the pad so it protrudes from the pad, and is pressed into the uncured laminate panel 41 on the layup tool as shown in FIG. 17.

The enlarged view of FIG. 17 also indicates an interface 75 where the cured pad matrix material of the base layer 22a meets the uncured laminate matrix material of the panel 41. A bond line forms at this interface 70 when the laminate matrix material is cured.

Figure 18:
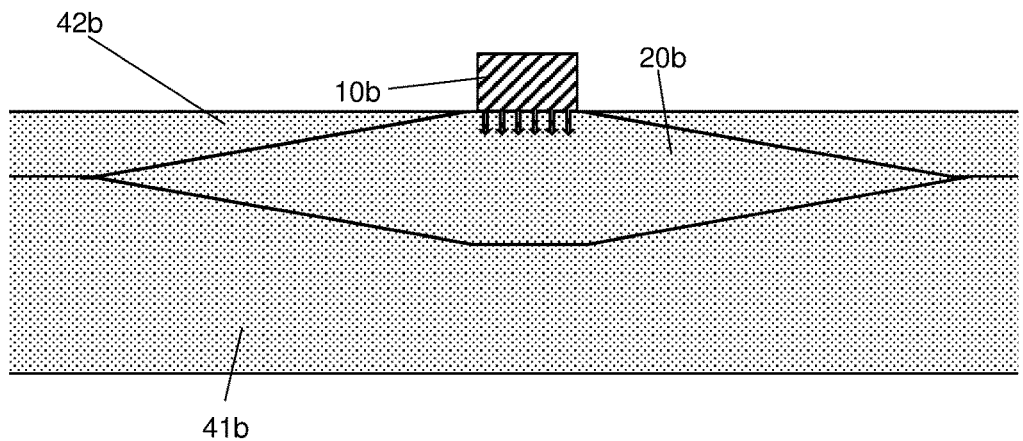
FIG. 18 shows a composite assembly with a double scarf joint.

FIG. 18 shows an alternative composite assembly in which the same reference numbers, appended by the letter b, are used to indicate features equivalent to FIG. 13. In this case the pad 20b is formed with a double-ramp so that a double-scarf joint is formed between the pad 20b and the laminate 41b, 42b.

Figure 19:
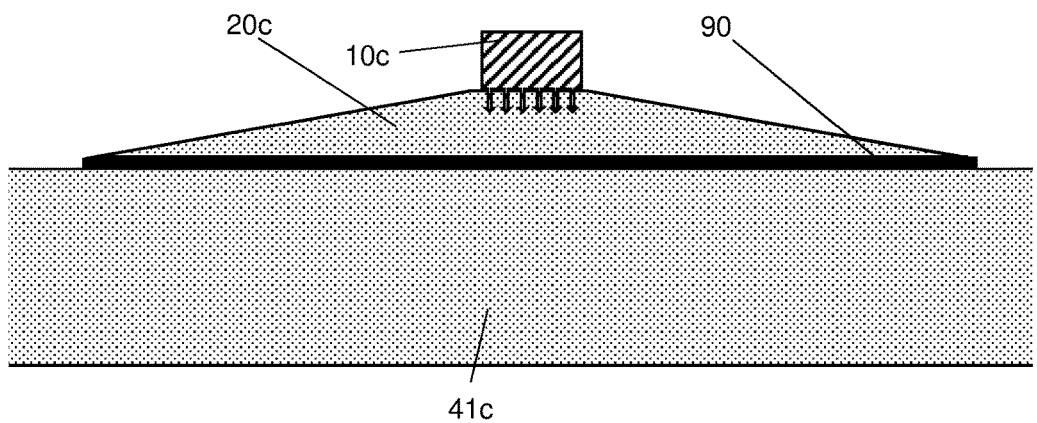
FIG. 19 shows a composite assembly with a pad which is not embedded in the laminate.

FIG. 19 shows a further alternative composite assembly in which the same reference numbers, appended by the letter c, are used to indicate features equivalent to FIG. 13. In this case the pad 20c is not embedded within the laminate, but rather sits on top of the laminate panel 41c to which it is bonded by an adhesive film 90 rather than a co-bonded scarf joint.

Figure 20:
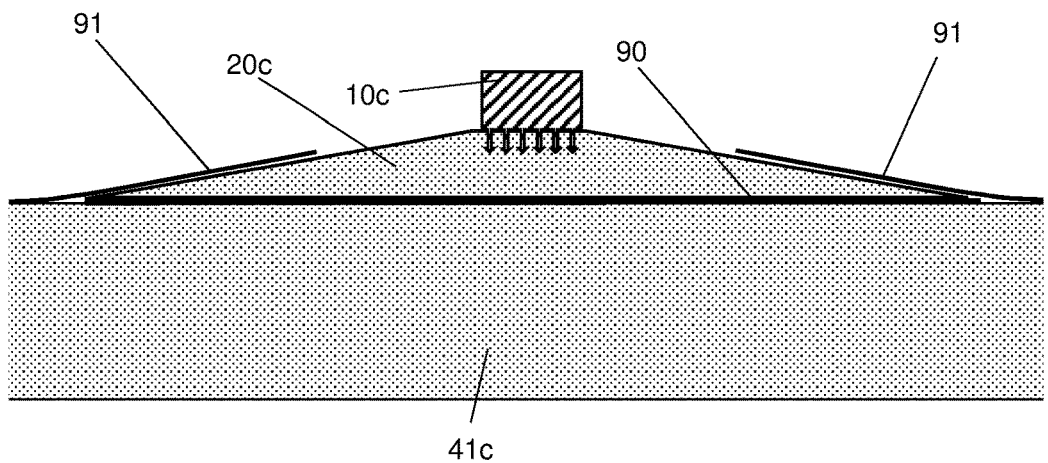
FIG. 20 shows the composite assembly of FIG. 19 with a cover ply added.

FIG. 20 is a variant of the assembly of FIG. 19, in which the laminate has a prepeg cover ply 91 which partially covers the pad 20c so that the pad 20c is embedded within the laminate.

Table 1 below sets out various alternative manufacturing processes which can be used to manufacture a composite assembly according to the present invention.

Eight manufacturing options are listed in Table 1. Option 2 is the method described above in FIGS. 1-12: at the time of penetration (FIGS. 1 and 2) the pad is a prepreg material (fibre plies impregnated with a pad matrix material); the pad is cured before it is inspected and integrated into the laminate so the prepreg is a cured prepreg at the time of inspection (FIG. 7) and at the time of integration (FIGS. 8-11); the laminate is uncured prepreg (fibre plies impregnated with a laminate matrix material) at the time of integration (FIGS. 8-11); and the pad/laminate joints in the final assembly of FIG. 12 are co-bonded joints.

TABLE 1

| Option | pad at penetration | pad cure? | pad at integration | laminate at integration | pad/laminate joints |
|---|---|---|---|---|---|
| 1 | Prepreg | No | uncured prepreg | uncured prepreg | co-cured |
| 2 | Prepreg | yes | cured prepreg | uncured prepreg | co-bonded |
| 3 | Prepreg | No | uncured prepreg | cured prepreg | co-bonded |
| 4 | Prepreg | yes | cured prepreg | cured prepreg | secondary bonded |
| 5 | dry fibre | No | dry fibre | dry fibre | co-infused |
| 6 | dry fibre | yes | infused and cured | uncured prepreg | co-bonded |
| 7 | dry fibre | yes | infused and cured | cured prepreg | secondary bonded |
| 8 | Prepreg | yes | cured prepreg | dry fibre | co-bonded |

Option 1 is an alternative method in which the pad matrix material and the laminate matrix material are cured at the same time so that the pad/laminate joints are co-cured joints. In this case, the pad matrix material and the laminate matrix material coalesce to form co-cured joints between the pad and the laminate Option 3 is an alternative method in which the co-bonded pad/laminate joints are formed by curing the pad matrix material rather than the laminate matrix material.

Option 4 is the method of forming the assembly of FIG. 19. In this case the adhesive film 90 forms a secondary-bonded (or adhesive) joint between the pad 20c and the laminate 41c.

Options 5-8 all involve the use of dry fibre material at various stages of the manufacturing process. Dry fibre material consists of fibre plies which are not yet impregnated with matrix material. So in option 5 the pad is made of dry fibre at the time of penetration (FIGS. 1 and 2), the laminate is made of dry fibre at the time of integration (FIGS. 8-11), and the dry fibre pad and dry fibre laminate are simultaneously infused with a liquid resin material to impregnate the fibre plies and form the various co-infused pad/laminate joints.

Options 6-8 employ a mixture of prepreg and dry fibre. The pad matrix material and the laminate matrix material may have the same chemical composition, or they may have a different chemical composition. For example in options 6 and 7 the pad matrix material which is used to infuse the dry fibre plies of the pad may have a lower viscosity than the prepreg laminate matrix material; and in option 8 the laminate matrix material which is used to infuse the dry fibre plies of the laminate may have a lower viscosity than the prepreg pad matrix material.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A composite assembly, comprising:
   a laminate of fibre plies impregnated with a laminate matrix material;
   a pad of fibre plies impregnated with a pad matrix material, wherein the pad of fibre plies is bonded to the laminate of fibre plies by a stepped lap joint or a scarf joint after the pad matrix material is cured; and
   a part comprising a body with a plurality of protrusions which extend from the body and penetrate at least some of the fibre plies of the pad, wherein no protrusions penetrate the laminate, and,
   wherein the plurality of protrusions and the body are bonded with the pad.

2. A composite assembly according to claim 1 wherein the pad is embedded within the laminate.

3. A composite assembly according to claim 1 wherein the pad comprises a stack of three or more layers; each layer comprises one or more of the pad plies; each layer has a different area; and the areas of the layers decrease monotonically from a base layer with the largest area to an apex layer with the smallest area.

4. A composite assembly according to claim 1 wherein the body and the protrusions are formed from the same material.

5. A composite assembly according to claim 1 wherein the body and the protrusions are formed from a metal material.

6. A composite assembly according to claim 1 wherein the pad is bonded to the laminate by a co-cured joint, a co-bonded joint or a co-infused joint.

7. A composite assembly according to claim 1 wherein the pad matrix material contacts the protrusions to form co-bonded joints which bond the pad to the protrusions.

8. A composite assembly according to claim 1 comprising:
   a plurality of units, each unit comprising: a said pad of fibre plies impregnated with a pad matrix material, and a said part comprising a said body with protrusions extending from the body, wherein the protrusions penetrate at least some of the fibre plies of the pad; and the pad of each unit is bonded to the laminate.

9. A method of manufacturing a composite assembly, the method comprising:
   providing a part comprising a body with a plurality of protrusions extending from the body;
   pressing the protrusions into a pad of fibre plies so that the protrusions penetrate at least some of the fibre plies of the pad,
   wherein the plurality of protrusions and the body are bonded to the pad;
   after the protrusions have been pressed into the pad:
   curing a pad matrix material impregnating the pad,
   bonding the pad to a laminate of fibre plies impregnated with a laminate matrix material by a stepped lap joint or a scarf joint and after the pad matrix material is cured, and
   wherein no protrusions penetrate the laminate.

10. The method of claim 9 further comprising laying the fibre plies of the laminate onto the pad after the protrusions have been pressed into the pad and before the pad is bonded to the laminate.

11. The method of claim 9 further comprising inspecting the pad and/or the part for defects after the protrusions have been pressed into the pad and before the pad is bonded to the laminate, for instance by visual inspection, ultrasonic inspection or radiographic inspection.

12. The method of claim 9 wherein the pad matrix material contacts the protrusions as it cures to form co-bonded joints which bond the pad to the protrusions.

13. The method of claim 9 wherein as the protrusions are pressed into the pad they penetrate the pad matrix material impregnating the pad.

14. The method of claim 9 wherein as the protrusions are pressed into the pad, the fibre plies of the pad are dry fibre plies which are not yet impregnated with the pad matrix material; and the method further comprises infusing the dry fibre plies of the pad with the pad matrix material in an infusion stage after the protrusions have been embedded into the pad, and then curing the pad matrix material.

15. The method of claim 14 wherein the method further comprises infusing the laminate with the laminate matrix material in the infusion stage so that the pad matrix material and the laminate matrix material coalesce, and then co-curing the pad matrix material and the laminate matrix material to simultaneously form a co-infused joint between the pad and the laminate.

16. The method of claim 9 wherein the pad is bonded to the laminate by curing the pad matrix material in contact with the laminate matrix material and/or by curing the laminate matrix material in contact with the pad matrix material.

17. The method of claim 16 wherein the pad is bonded to the laminate by curing the laminate matrix material in contact with the pad matrix material to form a co-bonded joint between the pad and the laminate; or the pad is bonded to the laminate by curing the pad matrix material in contact with the laminate matrix material to form a co-bonded joint between the pad and the laminate.

18. The method of claim 16 wherein the pad is bonded to the laminate by simultaneously curing the pad matrix material and the laminate matrix material, wherein the pad matrix material and the laminate matrix material coalesce to form a co-cured or co-infused joint between the pad and the laminate.

19. A method of manufacturing a composite assembly, the method comprising:
   receiving a plurality of units, each unit comprising a pad of fibre plies impregnated with a pad matrix material and a part comprising a body with protrusions extending from the body, wherein the protrusions penetrate at least some of the fibre plies of the pad, wherein the plurality of protrusions and the body are bonded to the pad;
   bonding the pad of each unit to a laminate of fibre plies impregnated with a laminate matrix material so that the pads are integrated with the laminate by a stepped lap joint or a scarf joint after the pad matrix material is cured; and,
   wherein no protrusions penetrate the laminate.

* * * * *